United States Patent
Koo et al.

(10) Patent No.: US 8,291,420 B2
(45) Date of Patent: Oct. 16, 2012

(54) SYSTEM AND METHOD OF TASK ASSIGNMENT DISTRIBUTED PROCESSING SYSTEM

(75) Inventors: Yong Bon Koo, Gyeongsangnam-do (KR); Young Bin Seo, Seoul (KR); Jeong Ki Kim, Daejeon (KR); Jae Myoung Kim, Daejeon (KR); Seung Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 911 days.

(21) Appl. No.: 12/438,084

(22) PCT Filed: Jul. 23, 2007

(86) PCT No.: PCT/KR2007/003534
§ 371 (c)(1),
(2), (4) Date: Feb. 19, 2009

(87) PCT Pub. No.: WO2008/032926
PCT Pub. Date: Mar. 20, 2008

(65) Prior Publication Data
US 2010/0242040 A1 Sep. 23, 2010

(30) Foreign Application Priority Data
Sep. 14, 2006 (KR) .................. 10-2006-0089099

(51) Int. Cl.
G06F 9/46 (2006.01)
(52) U.S. Cl. ..................... 718/102; 712/28; 713/300
(58) Field of Classification Search .............. 718/102; 712/28; 713/300
See application file for complete search history.

(56) References Cited

U.S. PATENT DOCUMENTS

| | | | | |
|---|---|---|---|---|
| 5,543,667 | A | * | 8/1996 | Shavit et al. ................ 307/39 |
| 6,223,205 | B1 | | 4/2001 | Harchol-Balter et al. |
| 7,086,058 | B2 | * | 8/2006 | Luick ....................... 718/102 |

(Continued)

FOREIGN PATENT DOCUMENTS

| | | |
|---|---|---|
| JP | 4-302036 | 10/1992 |
| KR | 10-2004-0072681 | 8/2004 |
| KR | 10-2004-0110647 | 12/2004 |
| KR | 10-0478346 | 3/2005 |

OTHER PUBLICATIONS

Hakan Aydin, et al., "Energy-Aware Partitioning for Multiprocessor Real-Time Systems", Proceedings of the International Parallel and Distributed Processing Symposium, 2003. (Total 9 pages). Lance Hammond, et al., "A Single-Chip Multiprocessor", Computer, vol. 30, Issue 9, Sep. 1997. (pp. 79-85).
International Search Report for International Application No. PCT/KR2007/003534, mailed Oct. 26, 2007.

*Primary Examiner* — Idriss N Alrobaye
(74) *Attorney, Agent, or Firm* — Staas & Halsey LLP (57) ABSTRACT

A method of task assignment in a distributed processing system including a plurality of processors is proposed. The method of task assignment includes calculating utilities of tasks to be processed in execution units included in each processor and arranging the calculated results in descending order; calculating utility difference values between the execution units included in each processor and outputting a highest difference value; comparing a utility of the task with the output highest difference value; designating the task to be assigned to the execution unit having the lowest utility in a processor in which the highest difference value is generated when the utility of the task is less than or equal to the output highest difference value; repeating the calculating, comparing, and designating in the order of the arranged tasks; and assigning the tasks to the designated targets.

10 Claims, 4 Drawing Sheets

U.S. PATENT DOCUMENTS

| | | | |
|---|---|---|---|
| 7,308,590 B2 * | 12/2007 | Zagacki | 713/322 |
| 7,814,489 B2 * | 10/2010 | Uemura et al. | 718/103 |
| 8,024,596 B2 * | 9/2011 | Burge et al. | 713/340 |
| 2003/0217090 A1 * | 11/2003 | Chauvel et al. | 709/102 |
| 2005/0198634 A1 | 9/2005 | Nielson et al. | |
| 2007/0283172 A1 * | 12/2007 | Douriet et al. | 713/300 |
| 2008/0216087 A1 * | 9/2008 | Dillenberger et al. | 718/105 |
| 2010/0218006 A1 * | 8/2010 | Boss et al. | 713/300 |
| 2011/0119672 A1 * | 5/2011 | Ramaraju et al. | 718/102 |

* cited by examiner

SYSTEM AND METHOD OF TASK ASSIGNMENT DISTRIBUTED PROCESSING SYSTEM

CROSS REFERENCE TO RELATED APPLICATIONS

This application claims the benefit under 35 U.S.C. Section 371, of International Application No. PCT/KR2007/003534, filed Jul. 23, 2007, which claimed priority to Korean Application No. 10-2006-0089099, filed Sep. 14, 2006 in the Korean Intellectual Property Office, the disclosures of all of which are hereby incorporated by reference.

TECHNICAL FIELD

The present invention relates to a distributed processing system and a method of task assignment in the distributed processing system, and more particularly, to a method of task assignment for reducing energy consumption in a distributed processing system including a plurality of processors that interdependently control voltage.

BACKGROUND ART

Nowadays, research into low-power computing aimed at reducing energy consumption is actively progressing. A processor that operates and controls data flow in a computer is an essential component that has a direct effect on the performance of the computer. Accordingly, to meet constant demand for higher computing performance, ways of increasing processor operating speed have been studied and developed. However, as processor speed increases, so does electric power consumption, which presents an obstacle to the advancement of low-power computing. Therefore, there is call for a way to simultaneously increase processor performance and minimize energy consumption.

Korean Patent Application No. 2004-7010176, entitled "Method and Apparatus for Providing Supply Voltages to a Processor," discloses a structure including a processor, a voltage sensor, and a voltage controller. The processor includes the voltage sensor connected to one or more supply voltage input ports to receive supply voltage from the voltage controller. The voltage controller may adjust the supply voltage up or down to achieve a target value measured by the voltage sensor based on a control signal received from the voltage sensor. In other words, a variable voltage is provided through the voltage controller according to the value measured by the voltage sensor so that power consumption may be reduced.

However, there is a limit to minimizing energy consumption with the above configuration alone, and there is a need to optimize a method of adjusting the supply voltage with respect to the processor.

DISCLOSURE OF INVENTION

Technical Problem

The present invention is directed to a distributed processing system including a plurality of processors interdependently controlling voltage, in which efficient task assignment yields the same performance as a conventional method of task assignment but with lower energy consumption.

Technical Solution

One aspect of the present invention provides a method of task assignment with respect to a plurality of processors including a plurality of execution units that execute tasks, a voltage sensor for sensing a voltage of each execution unit, and a voltage controller for maintaining the voltages of the execution units at the same level based on the voltage of each execution unit sensed by the voltage sensor including the steps of: (a) calculating utility difference values between execution units included in each processor and outputting a highest difference value; (b) comparing a utility of a task with the output highest difference value; (c) designating the task to be assigned to the execution unit having the lowest utility in a processor in which the highest difference value is generated when the utility of the task is less than or equal to the output highest difference value as a result of the comparison; (d) repeating steps (a) to (c) with respect to every task; and (e) assigning the tasks to the designated targets.

Another aspect of the present invention provides a method of task assignment in a distributed processing system including a plurality of processors including the steps of: (a) calculating utilities of tasks to be processed in execution units included in each processor and arranging the calculated results in descending order; (b) calculating utility difference values between the execution units included in each processor and outputting a highest difference value; (c) comparing a utility of a task with the output highest difference value; (d) designating the task to be assigned to the execution unit having the lowest utility in a processor in which the highest difference value is generated when the utility of the task is less than or equal to the output highest difference value as a result of the comparison; (e) repeating steps (b) to (d) in the order of the arranged tasks; and (f) assigning the tasks to the designated targets.

Yet another aspect of the present invention provides a distributed processing system including: a plurality of processors including a plurality of execution units that execute tasks, a voltage sensor for sensing voltages of the execution units, and a voltage controller for maintaining voltages of the execution units at the same level based on the voltages of the execution units sensed by the voltage sensor; and an operating system for assigning a task to the execution unit having the lowest utility in a processor that has the highest utility difference value between the execution units included in each processor.

Advantageous Effects

As described above, according to the present invention, since high-utility tasks are executed in execution units in a specific processor, overall voltage levels in a system are lowered to thereby reduce power consumption.

DESCRIPTION OF MAIN ELEMENTS APPEARING IN THE ABOVE FIGURES 110 and 120: Processors
111, 113, 121 and 123: Execution units
115 and 125: Voltage controllers

MODE FOR THE INVENTION

Hereinafter, exemplary embodiments of the present invention will be described in detail. However, the present invention is not limited to the exemplary embodiments disclosed below, but can be implemented in various modified forms. The following exemplary embodiments are described so that this disclosure will be sufficiently detailed and comprehensive to enable one of ordinary skill in the art to make and practice the invention.

Before describing the present invention, a distributed processing system using an interdependent voltage control device according to an exemplary embodiment of the present invention will be described.

Figure 1:
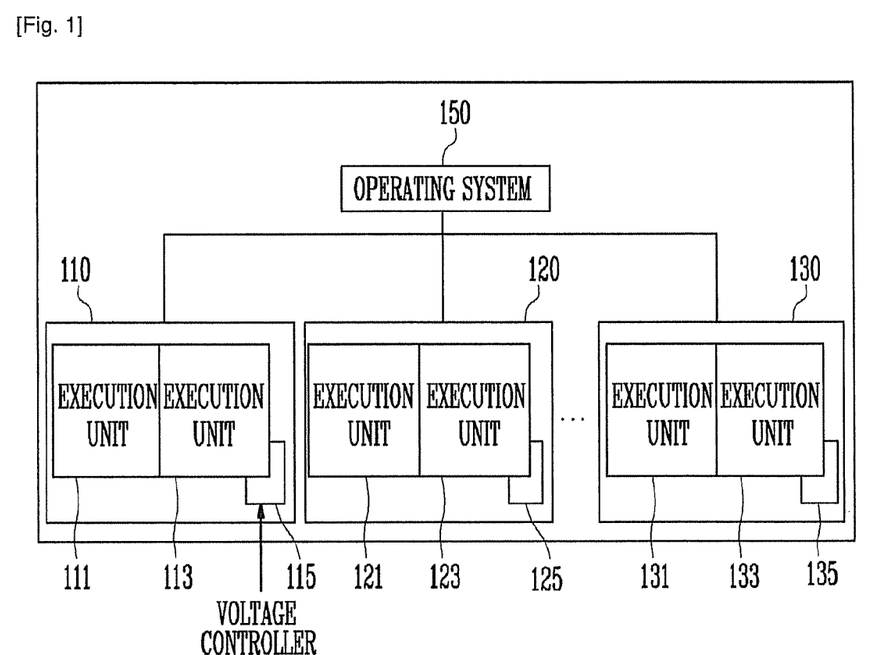
FIG. 1 illustrates a distributed processing system including a plurality of processors according to an exemplary embodiment of the present invention.

FIG. 1 illustrates a distributed processing system including a plurality of processors according to an exemplary embodiment of the present invention.

Referring to FIG. 1, the distributed processing system includes execution units 111, 113, 121, 123, 131 and 133 that execute tasks, a voltage sensor (not shown) for sensing voltages of the execution units, and voltage controllers 115, 125 and 135 for maintaining voltages of the execution units at the same level based on the voltages of the execution units sensed by the voltage sensor, a plurality of processors 110, 120 and 130 including the plurality of execution units, the voltage sensor, and the voltage controller, and an operating system 150 for managing the processors.

The processors 110, 120 and 130 that execute tasks are objects in which voltages can be individually controlled. In other words, different voltages may be applied to the processors. The processors include the plurality of execution units 111, 113, 121, 123, 131 and 133, and the voltage controllers 115, 125 and 135 for controlling the voltages of the execution units.

While the execution units are objects to which tasks are individually assigned, the same voltage is applied to the execution units included in the same processor by one voltage controller. The performance of an execution unit is measured by a value called the execution unit's capacity, which is given by the number of instructions that the execution unit can process per unit time. If an execution unit is capable of executing one million instructions per second, it can simultaneously execute one hundred real-time tasks that require ten thousand instructions per second each.

The operating system 150 determines which tasks will be assigned to the execution units in each processor. The present invention is characterized in that the task is assigned to an execution unit having the lowest utility in a processor having the highest utility difference value between the execution units included in the processors, which will be described below.

Meanwhile, the voltage controllers 115, 125 and 135 control a voltage of every execution unit included in the processors. Voltages of the execution units included in one processor are controlled by one voltage controller, and the voltage of any one execution unit depends upon the voltages of all the other execution units. This is referred to as interdependent voltage control. The voltage controller maintains the voltages of all execution units in the same processor at the same level based on the voltage of an execution unit that consumes the largest amount of electric power in the processor. Functions of the voltage controller will be described below with reference to the accompanying drawings.

Figure 2:
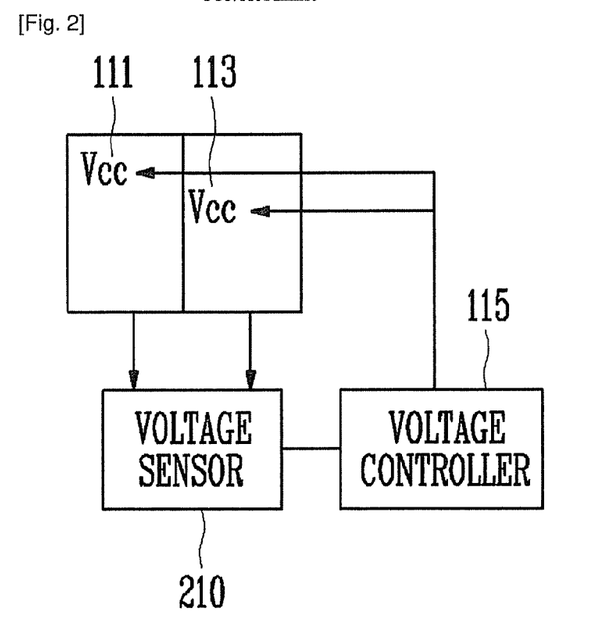
FIG. 2 illustrates internal components of a processor of FIG. 1 according to an exemplary embodiment of the present invention.

FIG. 2 illustrates internal components of a processor of FIG. 1 according to an exemplary embodiment of the present invention.

Referring to FIG. 2, the processor 110 includes a voltage controller 115, execution units 111 and 113, and a voltage sensor 210.

The voltage sensor 210 senses the voltage across the execution units and transmits the results to the voltage controller 115. Further, the voltage controller 115 controls the voltages of the execution unit 111 and 113 based on the voltage sensed by the voltage sensor.

Based on the above configuration, when the voltage status of the execution units are different from each other, the voltages of all execution units are controlled to equal that of the execution unit that consumes the most power. This is referred to as interdependent voltage control.

However, the above configuration has the problem that even when each of the execution units consumes a different amount of electricity, voltage is supplied to the execution units based on the voltage supplied to the execution unit that consumes the largest amount of electricity. For example, given that there are four different execution units A, B, C and D, execution units A and B are included in a processor, and execution units C and D are included in another processor. When tasks are assigned to execution units A, B, C, and D so that they respectively consume 1, 0.3, 0.7 and 0.1 amounts of electricity, without taking any measures, voltages corresponding to power consumptions of 1 and 0.7 are respectively applied to execution units B and D according to the interdependent voltage control. However, if the tasks assigned to execution units B and C were instead assigned to execution units C and D, it is sufficient for a voltage corresponding to a power consumption of only 0.3 to be applied to execution units C and D, which results in reduced power consumption.

As described above, the present invention is characterized by a method of assigning tasks to execution units. Exemplary embodiments of the present invention will be described below with reference to the accompanying drawings.

Figure 3:
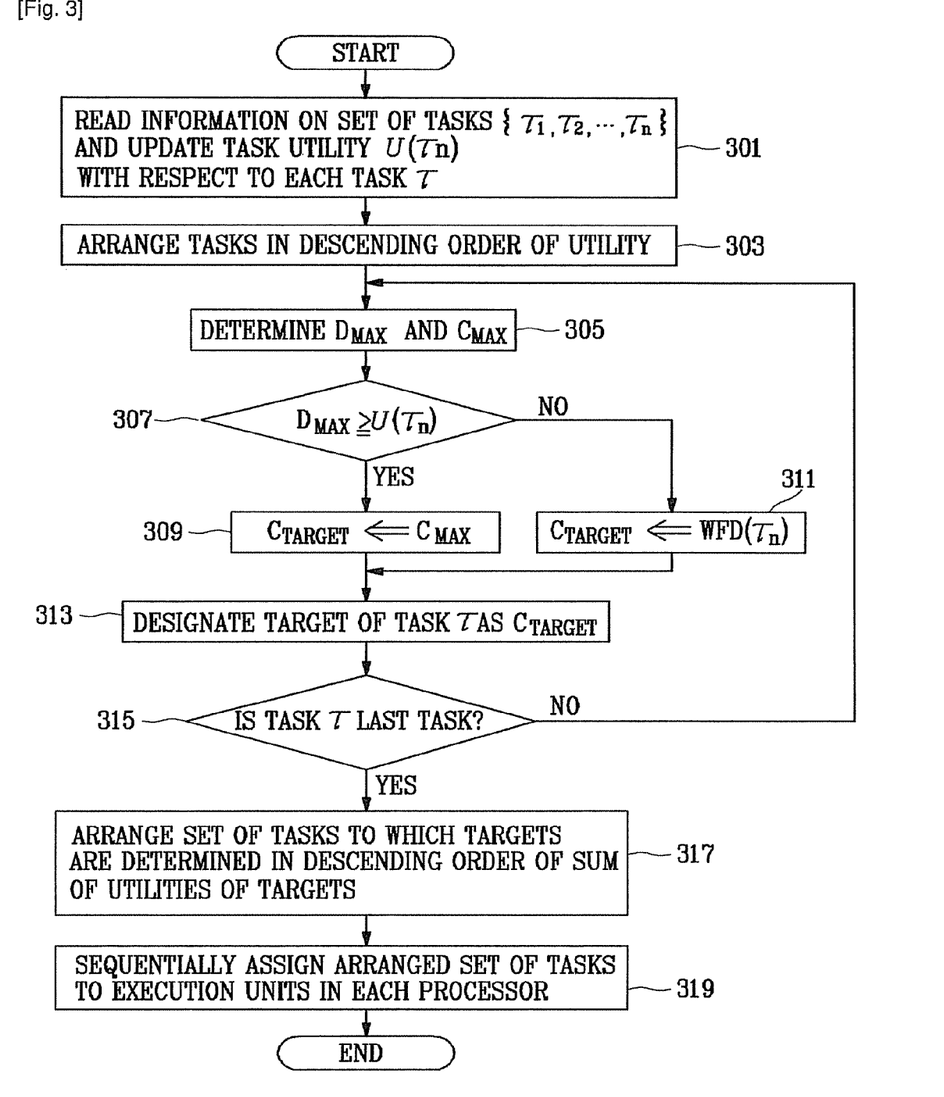
FIG. 3 is a flowchart illustrating task assignment to each execution unit according to an exemplary embodiment of the present invention.

FIG. 3 is a flowchart illustrating a process of assigning each task to each execution unit according to an exemplary embodiment of the present invention.

Referring to FIG. 3, first, information on a set of tasks is read, and a task utility of each task is determined (step 301).

Each task to be processed in an execution unit is represented as $\tau n$, and the set of tasks is represented as $\{\tau 1, \tau 2, \ldots, \tau n\}$.

Meanwhile, task utility refers to the ratio of the capacity of an execution unit used to execute a task to the total capacity of the execution unit, as shown in Equation 1:

$$U(\tau n)= \quad \text{[Equation 1]}$$

capacity required to execute task/capacity of execution unit

As mentioned above, the capacity of the execution unit refers to the number of instructions that the execution unit can process per unit time. Also, the capacity required to execute a task refers to the number of instructions to be processed per unit time when the task is executed.

On the assumption that the execution of each task requires a different number of instructions to be processed and power consumption increases in proportion to the number of instructions to be processed, the utility indicates which task consumes more electricity, and its value is as a real number ranging from 0 to 1.

After the utility of each task is calculated as above, the calculated results are arranged in descending order based on the utilities (step 303). In other words, the operating system 150 assigns the tasks to the execution units in the order of highest to lowest utility.

Then, the utility difference values between the execution units included in each processor are calculated to output a highest difference value, and an execution unit that has a lowest utility in the processor where the highest difference value is output is identified (step 305).

Here, the utilities of the execution units are given by the following Equation 2:

$$U(C_{nm}) = \text{sum of utility of assigned task/capacity of execution unit} \quad \text{[Equation 2]}$$

Here, $C_{nm}$ denotes an $m^{th}$ execution unit in an $n^{th}$ processor.

Meanwhile, $D_{MAX}$ denotes a highest difference value among the calculated utility differences of the execution units in the same processor, and $C_{MAX}$ denotes the execution unit having the lowest utility in the corresponding processor having the highest difference value. Methods of calculating $D_{MAX}$ and $C_{MAX}$ will be described below in detail with reference to FIG. 4.

Next, the determined $D_{MAX}$ value is compared with a utility $U(\tau n)$ of each task (step 307). Here, the values are compared with each other in descending order as arranged in the previous step (step 303). After a task is compared and the next steps (steps 309 to 315, described below) are performed, $D_{MAX}$ and $U(\tau n)$ are compared once again.

As a result of the comparison, when a utility $U(\tau n)$ of a specific task is less than or equal to $D_{MAX}$, the task is assigned to $C_{MAX}$ execution unit in the corresponding processor (step 309). As described above, the minimization of utility differences between tasks assigned to execution units in the same processor, and reduction of energy consumption through the task assignment are objectives of the present invention.

As a result of the comparison, when the utility $U(\tau n)$ of a specific task is greater than $D_{MAX}$, a target to which a task is assigned is determined using a Worst-Fit-Decreasing (WFD) method to be described below with reference to FIG. 5 (step 311.)

A target determined in the above steps (steps 309 and 311) is designated as an execution unit to which the task is assigned (step 313).

If there is still a task for which a target is not designated, the above steps (steps 305 to 313) are repeated. Otherwise, the next step (step 317) is executed (step 315).

When targets of the tasks are completely assigned in the above step (step 315), a plurality of sets of tasks for which targets are designated are arranged in descending order with respect to the sum of the utility of each target (step 317).

After the above step (step 317), the arranged tasks are sequentially assigned to the designated targets (step 319).

Now, the remaining steps (steps 309 and 311) that have not been described in detail above will be described below with reference to FIGS. 4 and 5.

Figure 4:
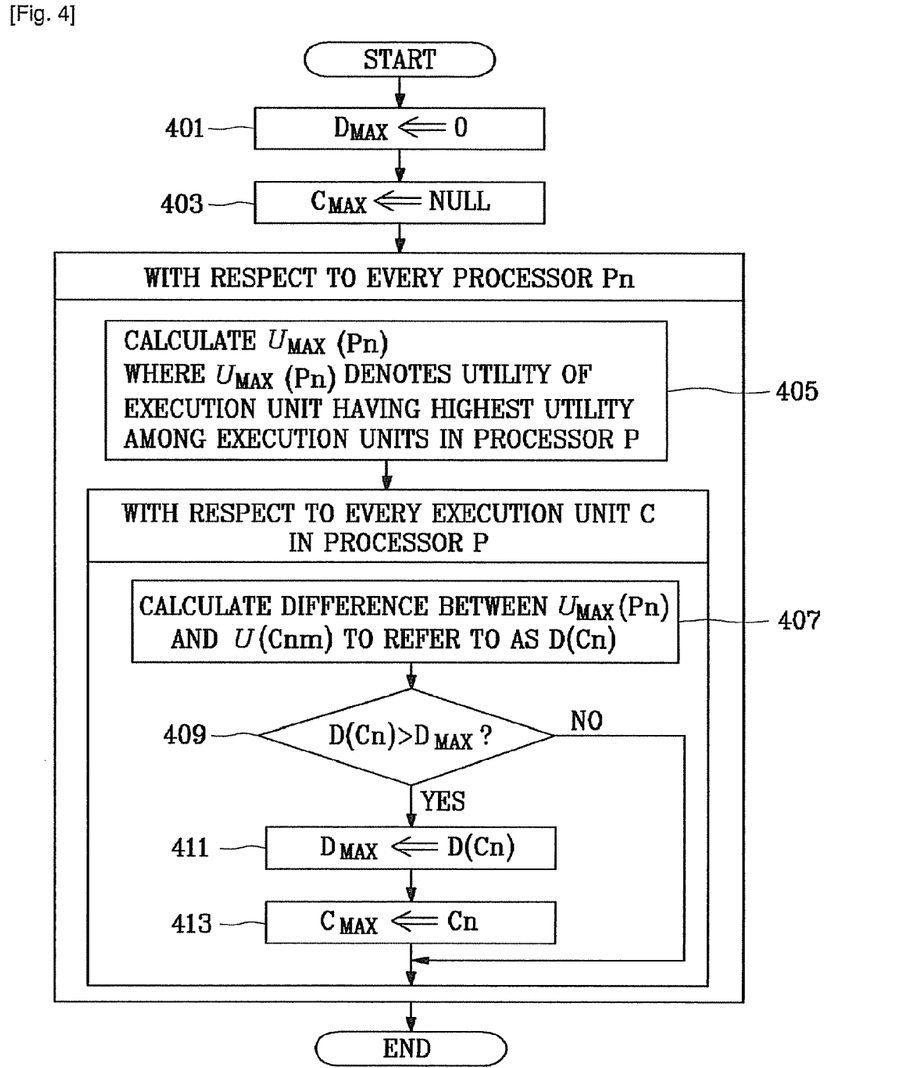
FIG. 4 is a flowchart illustrating a detailed method of calculating $D_{MAX}$ and $C_{MAX}$ according to an exemplary embodiment of the present invention.

FIG. 4 is a flowchart illustrating a method of calculating $D_{MAX}$ and $C_{MAX}$ in detail according to an exemplary embodiment of the present invention.

Referring to FIG. 4, first, an initial value of D is designated as zero (0) (step 401), and an initial value of $C_{MAX}$ is designated as NULL (step 403).

Next, the execution unit having the highest utility in each processor is selected and designated as the highest utility in the corresponding processor (step 405).

The highest utility is represented as $U_{MAX}(P_n)$. On the assumption that there are n processors, the highest utility for each processor is calculated.

Next, the difference values between the highest utility for each processor designated in the above step and the utility of another execution unit in the corresponding processor is calculated (step 407).

Since each processor may have a plurality of execution units, it is assumed that there are m execution units. Here, the number of execution units included in each processor may vary, but is assumed to be m for convenience. The difference value is represented by the following Equation 3:

$$D(C_n) = U_{MAX}(P_n) - U(C_{nm}) \quad \text{[Equation 3]}$$

Here, $C_{nm}$ denotes an $m^{th}$ execution unit in an $n^{th}$ processor, and $D(C_n)$ denotes the difference value.

Next, a highest value is found among the difference values $D(C_n)$ to be designated as the highest difference value $D_{MAX}$, and the execution unit having the lowest utility in the processor having the highest difference value is designated as $C_{MAX}$ (steps 409 to 411).

In other words, the execution unit having the highest utility and the execution unit having the lowest utility in each processor are searched for to calculate the difference value between the execution units. As a result of the calculation, the highest among the difference values is determined as $D_{MAX}$ and the corresponding execution unit is determined as $C_{MAX}$.

Figure 5:
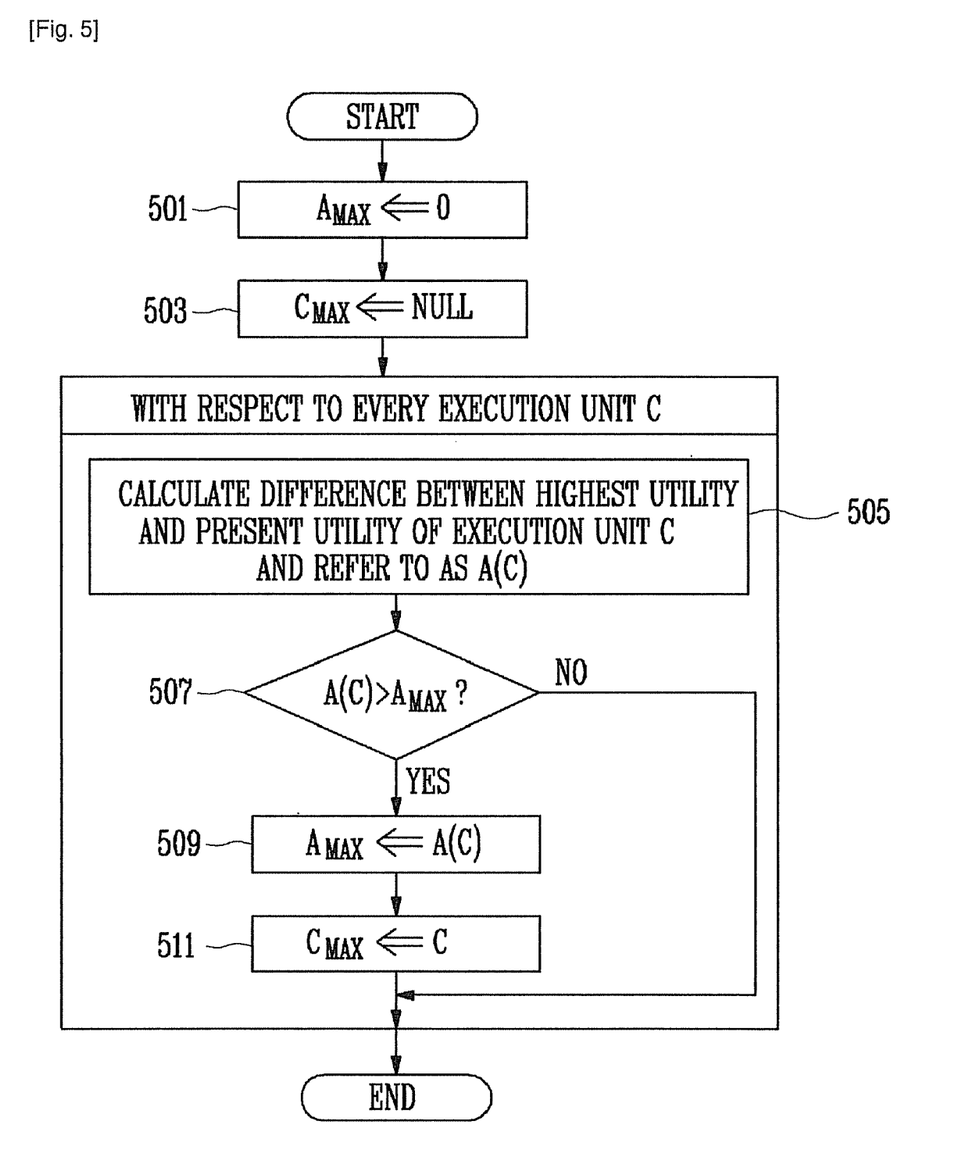
FIG. 5 illustrates a Worst-Fit-Decreasing (WFD) method according to an exemplary embodiment of the present invention.

Meanwhile, FIG. 5 illustrates a WFD method according to an exemplary embodiment of the present invention. The WFD method corresponds to a conventional task assignment method. The operating system designates the execution unit having the largest difference from the utility of the task as a target to which the task is assigned.

Referring to FIG. 5, a highest difference value $A_{MAX}$ between the utility of an execution unit and the utility of a task is initially designated as zero (0) (step 501), and the initial value of an execution unit $C_{MAX}$ having the value is initially designated as NULL (step 503).

Next, the difference between the utility of each task unit and the utility of each execution is calculated (step 505).

The calculation of the difference value is performed on every execution unit regardless of processor, and the difference value is designated as A(C).

Next, among the difference values A(C), the highest value is found and designated as $A_{MAX}$, and the corresponding execution unit is designated as $C_{MAX}$ (steps 507 to 511).

In other words, the execution unit having the highest utility is found regardless of processor and designated as target of the task.

For a better understanding of the invention, reference may be made to the following description of an exemplary embodiment.

As described above, it is assumed that there are four different execution units A, B, C and D, which respectively have the following utilities.

A=1, B=0.3, C=0.7 and D=0.1

Also, it is assumed that there are utilities of tasks to be processed as follows.

$U(\tau_1)=0.3, U(\tau_2)=0.8, U(\tau_3)=0.6$ and $U(\tau_4)=0.2$

Now, before assigning each task to each execution unit, the utilities are arranged in descending order (step 303).

$U(\tau_2)=0.8$, $U(\tau_3)=0.6$, $U(\tau_1)=0.3$ and $U(\tau_4)=0.2$

Then, $D_{MAX}$ and $C_{MAX}$ are determined (step 305).

At present, a utility difference between the execution units A and B included in the same processor is 0.7, and a utility difference between the execution units C and D is 0.6. Therefore, D is 0.7 and C is B that has the lowest utility equal to 0.3 in the corresponding processor.

Then, the tasks are sequentially compared with the value of $D_{MAX}$, and a target of each task is determined according to the comparison results (step 307).

For example, when $U(\tau_2)$ is 0.8, the value is higher than $D_{MAX}$, and thus a task is determined through step 311. Accordingly, the task is designated to be assigned to the execution unit D since the execution unit that has the highest among the utility differences between the execution units and the tasks is D equal to 0.1.

If there is still a task which is not designated, the above steps are repeated based on the designation results.

When the values of $D_{MAX}$ and $C_{MAX}$ are determined, the utility difference between the execution units A and B is 0.7, and the utility difference between the execution units C and D is 0.2

$(C=0.7,$ and $D=0.1+0.8(U(\tau_2))=0.9)$.

As a result, $D_{MAX}$ is 0.7 and $C_{MAX}$ is 0.3.

Next, when $U(\tau_3)$ is equal to 0.6, it is less than $D_{MAX}$, and thus a task is determined through step 309. Accordingly, the task is designated to be assigned to the execution unit B that has $C_{MAX}$.

The above processes are repeatedly performed to designate a target.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of task assignment with respect to a plurality of processors comprising a plurality of execution units that execute tasks, a voltage sensor for sensing a voltage of each execution unit, and a voltage controller for maintaining the voltages of the execution units at the same level based on the voltage of each execution unit sensed by the voltage sensor, the method comprising
   calculating utility difference values between the execution units in each processor and outputting a highest difference value;
   comparing a utility of a task with the output highest difference value; designating the task to be assigned to the execution unit having the lowest utility in a processor in which the highest difference value is generated when the utility of the task is less than or equal to the output highest difference value as a result of the comparison;
   repeating the calculating, comparing, and designating with respect to every task; and
   assigning the tasks to the designated execution units,
   wherein the calculating utility difference values between the execution units in each processor and outputting a highest difference value comprises
   calculating the utility of the execution unit having the highest utility in each processor;
   calculating difference values between the calculated highest utility and utilities of other execution units in a processor; and
   selecting a processor having the highest difference value among the calculated difference values and outputting the highest difference value.

2. The method of task assignment of claim 1, further comprising designating the execution unit having the highest utility difference between its own utility and the utility of the task as a target to which the task is assigned when the utility of the task is greater than the output highest difference value as a result of the comparison.

3. A method of task assignment in a distributed processing system comprising a plurality of processors, the method comprising
   calculating utilities of tasks to be processed in execution units in each processor and arranging the calculated results in descending order;
   calculating utility difference values between the execution units in each processor and outputting a highest difference value;
   comparing the utility of the task with the output highest difference value; designating the task to be assigned to the execution unit having the lowest utility in a processor in which the highest difference value is generated when the utility of the task is less than or equal to the output highest difference value as a result of the comparison;
   repeating the calculating, comparing, and
   designating in the sequence of the arranged tasks; and assigning the tasks to the designated execution units,
   wherein the calculating utility difference values between the execution units in each processor and outputting a highest difference value comprises
   calculating the utility of the execution unit having the highest utility in each processor;
   calculating difference values between the output highest utility in each processor and utilities of other execution units in the corresponding processor; and
   selecting a processor having the highest difference value among the calculated difference values and outputting the highest difference value.

4. The method of task assignment of claim 3, wherein the processor comprises a plurality of execution units, a voltage sensor for sensing the voltage across the execution units, and an interdependent voltage controller for maintaining voltages of the execution units at the same level based on the voltage sensed by the voltage sensor.

5. The method of task assignment of claim 3, further comprising designating the execution unit having the largest difference between its own utility and the utility of the task as a target to which the task is assigned when the utility of the task is greater than the output highest difference value as a result of the comparison.

6. A distributed processing system, comprising:
   a plurality of processors comprising
      a plurality of execution units that execute tasks,
      a voltage sensor for sensing voltages of the execution units, and
      a voltage controller for maintaining voltages of the execution units at the same level based on the voltages of the execution units sensed by the voltage sensor; and
   an operating system for assigning the task to the execution unit having the lowest utility in a processor having the highest utility between the execution units in each processor and calculating utility difference values between the execution units in each processor and outputting a highest difference value, comparing a utility of a task with the output highest difference value; designating the task to be assigned to the execution unit having the lowest utility in a processor in which the highest difference value is generated when the utility of the task is less than or equal to the output highest difference value as a result of the comparison, repeating the calculating, comparing, and designating with respect to every task and assigning the tasks to the designated execution units, wherein the calculating utility difference values between the execution units in each processor and outputting a highest difference value comprises calculating the utility of the execution unit having the highest utility in each processor; calculating difference values between the calculated highest utility and utilities of other execution units in a processor; and selecting a processor having the highest difference value among the calculated difference values and outputting the highest difference value.

7. The distributed processing system of claim 6, wherein the voltage controller in the processor maintains the voltages of all execution units in the processor at the same level based on the voltage of an execution unit consuming the largest amount of electric power among the execution units in the processor.

8. The distributed processing system of claim 6, wherein the processor executes the assigned task by means of the operating system.

9. The distributed processing system of claim 6, wherein the operating system assigns each task in sequence from highest to lowest utility.

10. The distributed processing system of claim 6, wherein the operating system assigns the task to the execution unit having the largest difference between its own utility and the utility of the task.

* * * * *